US008782692B2

(12) United States Patent
Wei et al.

(10) Patent No.: US 8,782,692 B2
(45) Date of Patent: Jul. 15, 2014

(54) METHOD AND APPARATUS FOR RECOMMENDING MEDIA PROGRAMS

(75) Inventors: Eugene Chuan-Huai Wei, Los Angeles, CA (US); Peter E. Sargent, Santa Monica, CA (US); Hua Zheng, Beijing (CN)

(73) Assignee: Hulu, LLC, Santa Monica, CA (US)

( * ) Notice: Subject to any disclaimer, the term of this patent is extended or adjusted under 35 U.S.C. 154(b) by 143 days.

(21) Appl. No.: 13/074,863

(22) Filed: Mar. 29, 2011

(65) Prior Publication Data

US 2012/0096487 A1    Apr. 19, 2012

Related U.S. Application Data

(60) Provisional application No. 61/393,846, filed on Oct. 15, 2010.

(51) Int. Cl.
| | |
|---|---|
| H04N 7/10 | (2006.01) |
| H04N 7/025 | (2006.01) |
| H04N 21/222 | (2011.01) |
| H04N 21/234 | (2011.01) |
| H04N 21/235 | (2011.01) |
| H04N 21/237 | (2011.01) |
| H04N 21/24 | (2011.01) |
| H04N 21/2543 | (2011.01) |
| H04N 21/2547 | (2011.01) |
| H04N 21/435 | (2011.01) |
| H04N 21/44 | (2011.01) |
| H04N 21/442 | (2011.01) |

(52) U.S. Cl.
CPC ....... *H04N 21/222* (2013.01); *H04N 21/23424* (2013.01); *H04N 21/2353* (2013.01); *H04N 21/237* (2013.01); *H04N 21/2408* (2013.01); *H04N 21/25435* (2013.01); *H04N 21/2547* (2013.01); *H04N 21/435* (2013.01); *H04N 21/44016* (2013.01); *H04N 21/44204* (2013.01); *H04N 21/44222* (2013.01)
USPC ......... 725/34; 725/9; 725/13; 725/20; 725/22

(58) Field of Classification Search
CPC .......... H04N 21/222; H04N 21/23424; H04N 21/2353; H04N 21/237; H04N 21/2408; H04N 21/25435; H04N 21/2547; H04N 21/435; H04N 21/44016; H04N 21/44204; H04N 21/44222
USPC ....................................... 725/13, 38, 86, 131
See application file for complete search history.

(56) References Cited

U.S. PATENT DOCUMENTS

| | | | |
|---|---|---|---|
| 5,608,447 A | 3/1997 | Farry et al. | |
| 5,774,170 A | 6/1998 | Hite | |

(Continued)

FOREIGN PATENT DOCUMENTS

| | | |
|---|---|---|
| JP | 2002-271736 | 9/2002 |
| JP | 2003-162543 | 6/2003 |
| JP | 2006-191633 | 7/2006 |

OTHER PUBLICATIONS

U.S. Appl. No. 13/074,873, filed Mar. 29, 2011 entitled "Process Workflow for Recommending Media Programs".

(Continued)

*Primary Examiner* — Dominic D Saltarelli
(74) *Attorney, Agent, or Firm* — Fountainhead Law Group P.C.

(57) ABSTRACT

A method, system, and computer program product provide the ability to recommend, to a first viewer, alternative programming during playback of a first media program. The first media program is played. A second media program of potential interest to the user is identified. During an advertising break, an interface is presented to the user that identifies the second media program. An indication of interest in the second media program is received from the user. If the indication indicates that the user is interested in the second media program, a reference to the second media program is saved as a viewer recommendation for later playback. If not interested, additional input may be received from the user indicating why the user is not interested.

49 Claims, 14 Drawing Sheets

(56) References Cited

U.S. PATENT DOCUMENTS

| | | | |
|---|---|---|---|
| 5,848,397 A * | 12/1998 | Marsh et al. | 705/14.61 |
| 8,296,179 B1 | 10/2012 | Rennison | |
| 8,296,800 B2 | 10/2012 | Palazzo et al. | |
| 8,392,246 B2 | 3/2013 | Coladonato et al. | |
| 2003/0066068 A1 * | 4/2003 | Gutta et al. | 725/9 |
| 2003/0084450 A1 * | 5/2003 | Thurston et al. | 725/46 |
| 2003/0088871 A1 * | 5/2003 | Kimura | 725/46 |
| 2003/0106058 A1 * | 6/2003 | Zimmerman et al. | 725/46 |
| 2003/0112258 A1 | 6/2003 | Dietz | |
| 2003/0126600 A1 * | 7/2003 | Heuvelman | 725/35 |
| 2003/0208756 A1 | 11/2003 | Macrae et al. | |
| 2004/0045028 A1 | 3/2004 | Harris | |
| 2004/0163111 A1 | 8/2004 | Palazzo et al. | |
| 2005/0198668 A1 | 9/2005 | Yuen et al. | |
| 2007/0113243 A1 | 5/2007 | Brey | |
| 2007/0157228 A1 | 7/2007 | Bayer et al. | |
| 2007/0174471 A1 * | 7/2007 | Van Rossum | 709/229 |
| 2008/0021775 A1 | 1/2008 | Leman | |
| 2008/0127246 A1 | 5/2008 | Sylvain | |
| 2008/0148320 A1 | 6/2008 | Howcroft | |
| 2008/0250445 A1 | 10/2008 | Zigmond et al. | |
| 2009/0183199 A1 | 7/2009 | Stafford et al. | |
| 2009/0210899 A1 | 8/2009 | Lawrence-Apfelbaum et al. | |
| 2012/0054804 A1 | 3/2012 | Howfroft | |
| 2012/0096487 A1 | 4/2012 | Wei et al. | |
| 2012/0096488 A1 | 4/2012 | Wei et al. | |
| 2012/0110618 A1 | 5/2012 | Kilar et al. | |
| 2012/0124618 A1 | 5/2012 | Velasco et al. | |
| 2012/0304223 A1 | 11/2012 | Sargent et al. | |

OTHER PUBLICATIONS

U.S. Appl. No. 13/074,884, filed Mar. 29, 2011 entitled "Bookmarking Media for Subsequent Viewing".

U.S. Appl. No. 13/566,964, filed Aug. 3, 2012 entitled "Ad Selection and Next Video Recommendation in a Video Streaming System Exclusive of User Identity-Based Parameter".

International Search Report from International Application No. PCT/US2011/056587 mailed Mar. 27, 2012.

International Search Report from International Application No. PCT/US2013/052113 mailed Nov. 22, 2013.

* cited by examiner

METHOD AND APPARATUS FOR RECOMMENDING MEDIA PROGRAMS

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 61/393,846, filed Oct. 15, 2010, by Eugene Chuan-Huai Wei, entitled "METHOD AND APPARATUS FOR RECOMMENDING MEDIA PROGRAMS," which is incorporated by reference in its entirety for all purposes.

BACKGROUND OF THE INVENTION

1. Field of the Invention

The present invention relates to systems and methods for providing media programs for presentation to users, and in particular to a system and method for recommending such media programs.

2. Description of the Related Art

The dissemination and playback of media programs has undergone substantial changes in the past decade. Previously, media programs (which may include audio, video, or both) were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, digital technology also permitted the dissemination and playback of media programs via the Internet, and with improved signal processing and more and more households with high-speed Internet access (e.g. DSL, fiber, and/or satellite). These methods of dissemination and playback have become competitive with traditional means. Dissemination of media programs via the Internet may occur either by simple downloading, progressive downloading or streaming.

Simple downloading, progressive downloading, and streaming are described in copending provisional patent application Ser. Nos. 61/386,913, entitled "METHOD AND APPARATUS FOR PROVIDING DIRECTED ADVERTISING BASED ON USER PREFERENCES," and 61/392,898, entitled "METHOD AND APPARATUS FOR RECOMMENDING MEDIA PROGRAMS BASED ON CORRELATED USER FEEDBACK," incorporated by reference above.

The foregoing technologies permit a broad spectrum of media programs to be made available to the user for immediate viewing. One of the challenges in providing such a broad array of media programs is that it is difficult for the user to find programs of interest from among the many programs available. Interfaces can be provided that place media programs into different categories that can be searched by the user, however such interfaces are only useful if the user already has an idea about what kind of media program they are interested in. Offbeat, unusual, or difficult to categorize media programs, for example, would be difficult to find with such interfaces.

What is needed is a system and method for providing such recommendations. The present invention satisfies this need.

SUMMARY OF THE INVENTION

Unlike broadcast television, where advertising revenue depends on the generalized popularity of the television show during which the advertisement is shown, the length of the advertisement, and perhaps the daypart, advertising in a video on demand context is often based on "ad impressions," which may be defined as the number of viewings of the advertisement or the number of times viewers have expressed interest in the advertisement presented (e.g. by selecting the advertisement for further information). Since the number of "ad impressions" varies with the number of viewers actually watching a media program, it is possible that the media program provider may have provided all of the contracted advertising impressions and still have additional advertising time available during the presentation of media programs. Public service announcements (PSAs) may be played during such intervals, but PSAs do not generate revenue.

Described below is a system and method in which recommendations to view other media programs are substituted for reduced or zero revenue value advertisements such as PSAs, bonus advertisements (provided gratis after the contracted for ad impressions have been provided). In one embodiment, the decision to substitute media program recommendations is made according to a dynamic real time or near real time assessment of ad impression contractual obligations, and ad impression fulfillment, with a view to maximizing overall advertising revenue.

The media program recommendations may be analogous to a movie trailer and are designed to generate a visceral and emotional interest on the part of the user, something that a static image and text cannot accomplish in the same way. The media program provider may produce (in some cases, with the help of the source of the media program being advertised) short video trailers for shows and movies presented by the media program provider that are typically 30 to 80 seconds long.

These recommendations typically appear in the last advertising pod (break) of a longform media program (e.g. episodes, movies), but may also appear in short form media programs (e.g. one half hour media programs). The presentation of the advertisements in the last pod is preferred because experience has shown this placement to be most effective, presumably because this is the point at which most users are now considering which media program (if any) they will watch next.

Further, much of the value of a media program recommendation depends on the context in which the recommendation is made. Users may be provided with an interface that allows them to ask for a recommended program, but even when such a service is provided, it is often underutilized, since the user is apt to seek out such recommendations only when they cannot think of a media program of interest on their own, and experience has shown that this is not often. As a result, recommendation services are typically underutilized. Experience has also shown that when given in the proper context (including when the recommendations are presented and the options available to the user to act on those recommendations), recommendation services can increase viewership by an order of magnitude or more.

The Applicants have discovered the non-intuitive result that the increase in viewership offered by contextually convenient recommendation services are significant enough to offset the cost of presenting a recommendation in place of a paid advertisement that may otherwise be played during the media program, essentially trading greater revenue per media program played for greater revenue for more media programs viewed.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
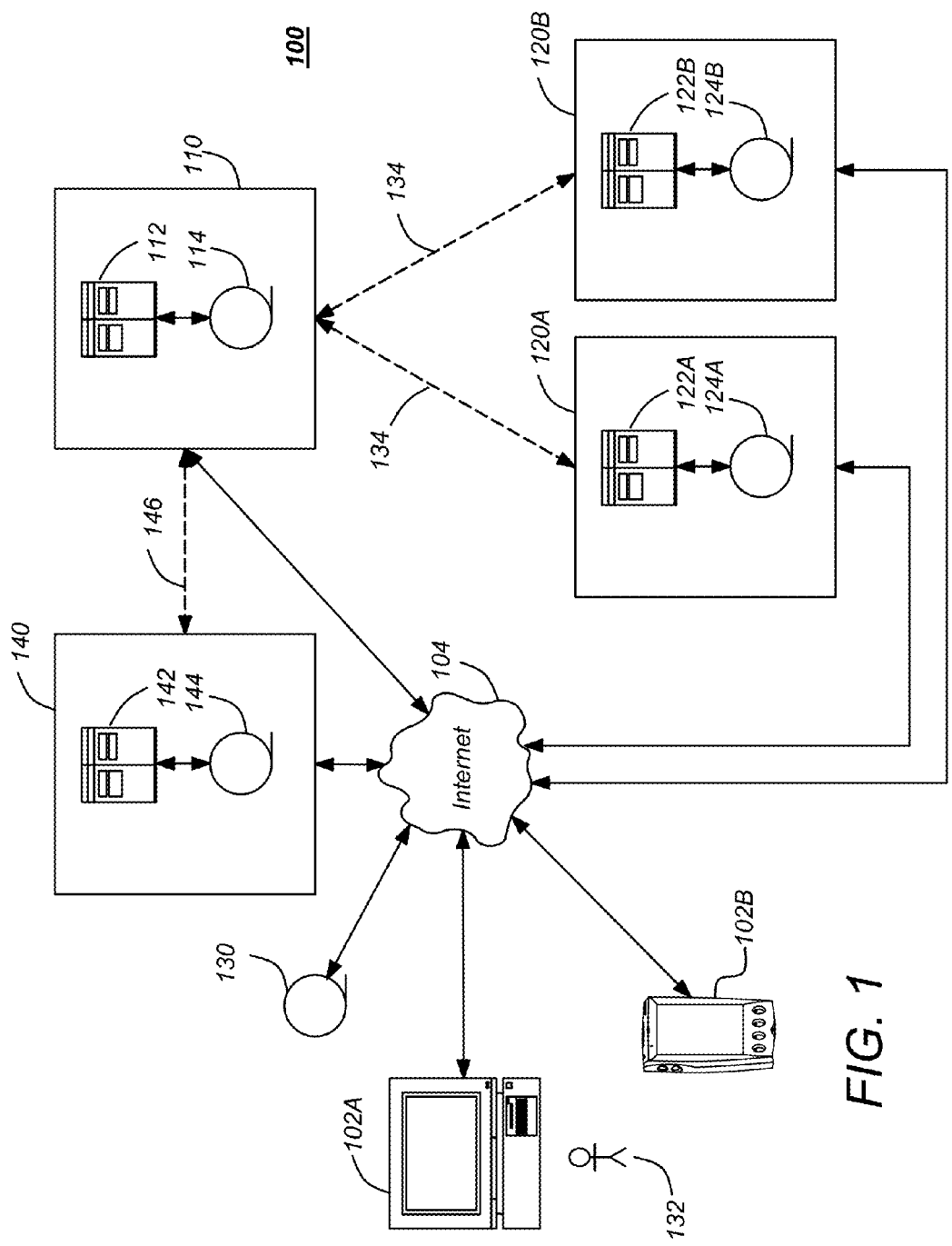
FIG. 1 is a diagram illustrating an exemplary media program system used in accordance with one or more embodiments of the invention.

FIG. 1 is a diagram illustrating an exemplary media program system 100. In the illustrated embodiment, the system 100 may comprise one or more media program sources 120A, 120B, communicatively coupled to a communication network 104 such as the Internet and each having one or more source video servers 122A, 122B communicatively coupled to one or more source media program databases 124A, 124B. The media program system 100 further comprises a media program provider 110, communicatively coupled to the communication network 104, and having one or more provider video servers 112 and one or more provider databases 114. In one embodiment, the media program provider 110 is a video-on-demand and/or streaming media program provider.

The media program system 100 transmits media programs to a first user device 102A such as a computer or a second user device 102B such as a cellphone (hereinafter alternatively referred to as user device(s) 120). This transmission may be direct from the media program provider 110, or the media program provider 110 may operate as a portal, providing an interface to the media programs available from the media program sources 120A and 120B, but not the media program itself (which is instead provided by the media program source(s) 120).

In the first case, the media program provider 110 licenses media programs from the media program sources 120 (such as www.fox.com or www.nbc.com), and metadata for such programs is also typically provided to the media program provider 110 from the media program source 120 as well. Such metadata can be retrieved by the media program provider's database 114 for use. If supplementary metadata is required, it can be obtained from a metadata source 130 independent from the media program provider 110 and the media program source 120, as described further below.

In the second case, the media programs are streamed to the user device 102 directly from the servers of the media program source 120. When the media program is streamed directly from the media program source 120, it is often the case that the metadata provided by the media program source 120 is insufficient. In such cases, supplementary metadata may be obtained from independent metadata source 130 (such as www.tv.com or www.imdb.com) or other third party sources. In this circumstance, the role of the media program provider 110 is that of a portal that provides the user 132 a list of available media programs and an interface to search to find such programs and to view them.

Media programs and metadata may be obtained via a communication network 104 such as the Internet, or through auxiliary (and/or dedicated) communication links 134). Such information may be obtained by webcrawling (for example, using a program or automated script that browses the World Wide Web in a methodical, automated manner).

Using the user devices 102, remote users 132 can communicate with the media program provider 110 using the communication network 104, to obtain media programs (including video-on-demand and/or streaming video services) and to search the provider media program database 114 to find media programs of interest.

The media program system 100 may also comprise one or more advertisement providers 140, which supply advertisements that are replayed in connection with the media programs provided by the media program provider 110 or media program sources 120. In the illustrated embodiment, the advertisement provider 140 includes an advertisement provider server 142 communicatively coupled to an associated and communicatively coupled advertisement provider database 144.

Advertisements may be supplied from the advertisement provider 140 to the media program provider 110 via the Internet 104, a dedicated link 146, or by physical exchange of a memory storage device having the advertisement. Such advertisements can be provided to and stored by the media program provider 110 and streamed or downloaded along with the media program to the user device(s) 102 at the appropriate time.

In one embodiment, the advertisements are integrated with the streamed or downloaded video from the media program provider 110. In another embodiment, the advertisements are not integrated with the media program, but are instead transmitted to the user devices 102 separately from the media program, and replayed at the appropriate time using indices that indicate when each advertisement should be presented. For example, advertisements can be indexed and streamed or downloaded to the user devices 102 (from the media program provider 110 or the advertisement provider 140), and such advertisements can be played back to the user 132 at times indicated by corresponding indices in the media program.

Figure 2:
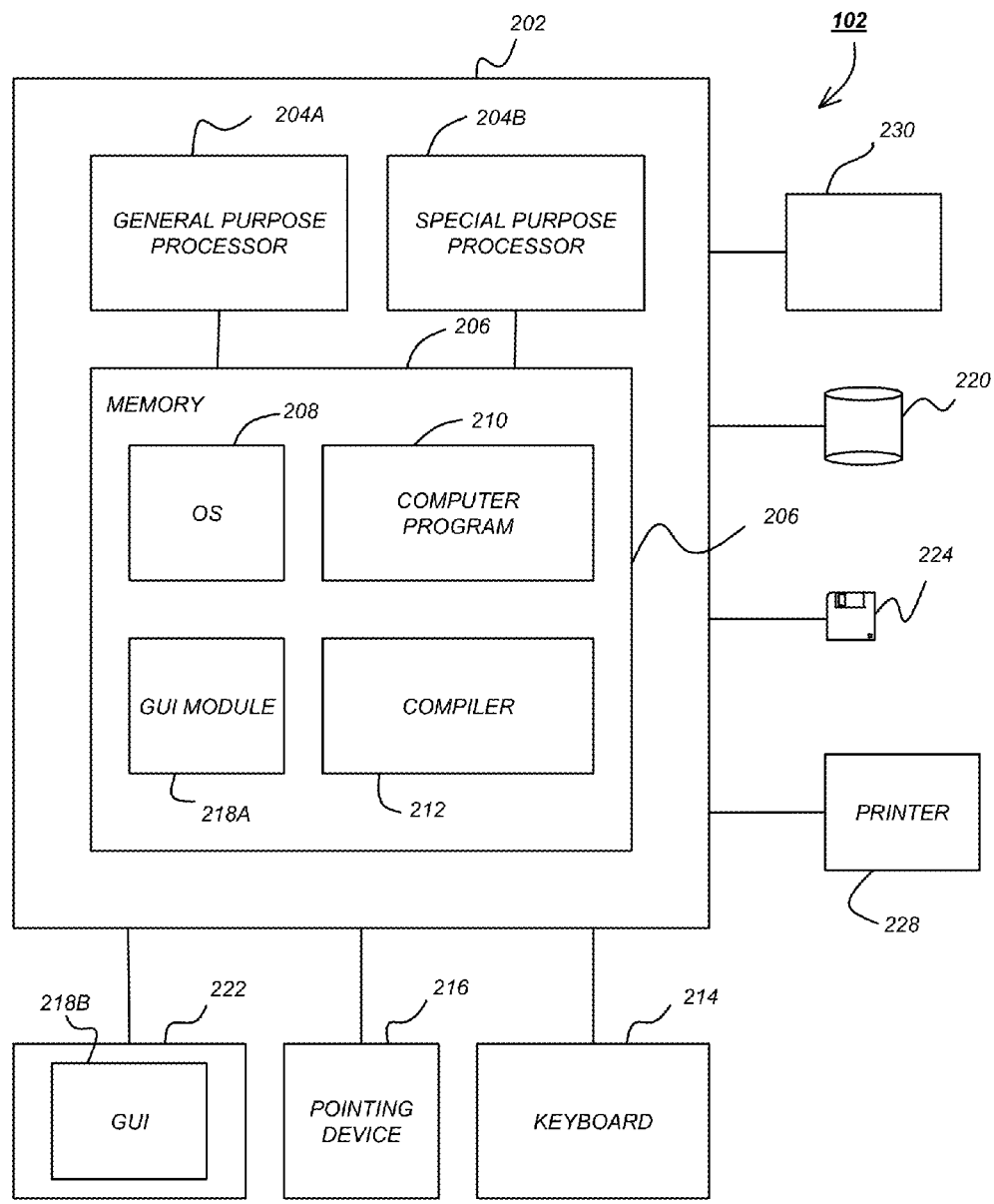
FIG. 2 illustrates an exemplary processing system that could be used to implement elements of one or more embodiments of the present invention.

FIG. 2 illustrates an exemplary processing system 202 that could be used to implement elements of the present invention, including the user devices 102, servers 112, 122, and 142 and the databases 114, 124, and 144. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general purpose processor 204A performing instructions defined by the computer program 210 under control of an operating system 208. The computer program 210 and/or the operating system 208 may be stored in the memory 206 and may interface with the user 132 and/or other devices to accept input and commands and, based on such input and commands and the instructions defined by the computer program 210 and operating system 208 to provide output and results.

Output/results may be presented on display 222 or provided to another device for presentation or further processing or action. Typically, the display 222 comprises a plurality of picture elements (pixels) that change state to collectively present an image to the user 132. For example, the display 222 may comprise a liquid crystal display (LCD) having a plurality of separately addressable pixels, each with a liquid crystal that changes to an opaque or translucent state to form a part of the image on the display in response to the data or information generated by the processor 204 from the application of the instructions of the computer program 210 and/or operating system 208 to the input and commands. Similarly, plasma displays include a pixel having three separate subpixel cells, each with a different color phosphor. The colors blend together to create the color presented in the pixel. Pulses of current flowing through the cells are varied according to the data generated by the processor from the application of the instructions of the computer program and/or operating system 208 in response to input and commands, changing the intensity of the light provided by the pixel. Also, similarly, cathode ray tube (CRT) displays include a plurality of pixels, each with each pixel having subpixels typically represented by dots or lines from an aperture grille. Each dot or line includes a phosphor coating that glows when struck by electrons from an electron gun. In response to the data generated by the processor from the application of instructions of the computer program and/or operating system 208, and in response to input and commands, the electrons emitted by the electron gun are steered at the dots or lines, thus changing the state of the associated pixel by causing the phosphor coating of that dot or line to glow.

The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 110 instructions may be implemented in a special purpose processor 204B. In this embodiment, some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, DVD, etc. Further, the operating system 208 and the computer program 210 are comprised of computer program instructions which, when accessed, read and executed by the computer 202, causes the computer 202 to perform the steps necessary to implement and/or use the present invention, or to load the program of instructions into a memory, thus creating a special purpose data structure causing the computer to operate as a specially programmed computer executing the method steps described herein. Computer program 210 and/or operating instructions may also be tangibly embodied in memory 206 and/or data communication devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Although the term "user computer" or user device is referred to herein, it is understood that a user computer or computer may include portable devices such as cellphones, portable MP3 players, video game consoles, notebook computers, pocket computers, personal data assistants (PDAs) or any other device with suitable processing, communication, and input/output capability.

Figure 3:
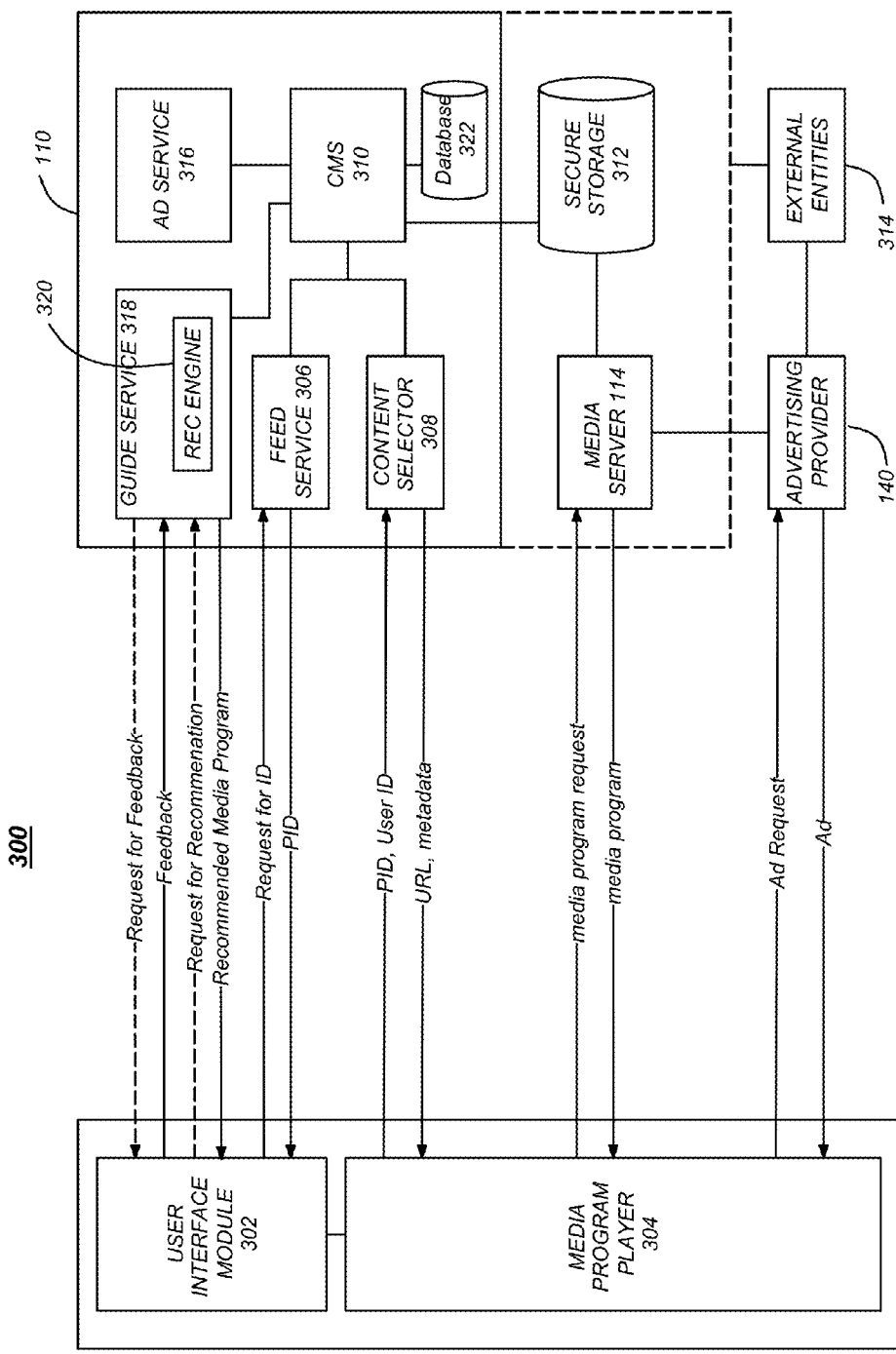
FIG. 3 is a diagram illustrating a first embodiment of a content delivery subsystem (CDS) and top-level operations that can be used to offer and deliver media programs for selection and presentation to the user in accordance with one or more embodiments of the invention.

FIG. 3 is a diagram illustrating a first embodiment of a content delivery subsystem (CDS) 300 and top-level operations that can be used to offer and deliver media programs for selection and presentation to the user 132. In the illustrated embodiment, the content delivery subsystem 300 includes the user device 102, a media program provider 110, and an advertisement provider 140.

In the illustrated embodiment, the media program provider 110 comprises a content management service 310, an advertisement service 316, a feed service 306, a content selector 308, and a guide service 318 which includes a recommendation engine 320. The CMS 310 stores data in database 322, including metadata regarding available media programs and user data.

In one embodiment, the recommendation engine 320 of the guide service 318 transmits a feedback request to the user device 102. This request may be transmitted after playback of the media program for which feedback is requested, or at another time. A request for feedback regarding a media program may also occur in response to provision of a guide service. For example, if a media program guide is provided to the user device 102, the media programs presented therein may include an interface that allows the user 132 to indicate whether they have viewed that media program, and if so, whether they liked the media program or how much they liked the media program.

The user then provides feedback regarding the media program(s) and transmits the feedback or opinion data to the recommendation engine 320. The recommendation engine receives the opinion data and stores it in the database 322 via the CMS 322 for later use as described below.

The same user 132, or another user 132, may then transmit a request for a recommendation to the recommendation engine 320. Using data retrieved from the database 322, the recommendation engine 320 generates one or more recommended media programs, and transmits information from which the user device 102 may gain access to those recommended media programs to the user device 102 for presentation by the user interface module 302. Further details regarding these operations are presented below.

When the user 132 selects a media program using the user device 102, a message is transmitted from the user device 102 to the media program provider 110 requesting the media program identifier (PID) of the selected media program.

The feed service 306 receives the request, and using information obtained from secure storage 312 or database 322 via the content management service 310, the feed service 306 determines the PID for the selected media program and transmits the PID to the user device 102. The user device transmits this PID and a user ID to the content selector 308 of the media program provider 110. The content selector 308 forwards the information to the content management service 310, which uses the advertisement service 318 to select advertisements appropriate for the user and selected media program, using information stored in secure storage 312. This may be accomplished as described in co-pending patent application Ser. No. 12/787,679, entitled "METHOD AND APPARATUS FOR RAPID AND SCALEABLE DIRECTED ADVERTISING SERVICE," by Wing Chit Mak, filed May 26, 2010, which application is hereby incorporated by reference herein. The content management service 310 forwards this information to the content selector 308, which transmits information from which the user device 102 may obtain the selected media program from the media server 114, as well as advertisements from the advertising provider 140. In the illustrated embodiment, this information includes the address (e.g. URL) where the desired media program can be obtained from the media server 114. The user device 102 transmits a media program request to the media server 114 at a specified address. The media server 114 retrieves the media program from secure storage, and transmits the media program to the user device 102. The user device 102 may also request advertisements from the advertising provider 140 and receive them as well.

Although the advertisement provider 140 and media server 114 is illustrated as a separate architectural entity than the media program provider 110, the advertisement provider 140 may be integrated with the media program provider 110 (that is, the media program provider may also provide the advertisements). The CDS 300 provides a means to provide media programs and advertisements across a plurality of distribution networks, which may include www.hulu.com, www.imdb.com, www.aol.com or www.msn.com.

Metadata related to media program and advertisement content as well as streaming information is stored in the content delivery system 300 in databases 312 and 322, as is data describing where the media programs and advertisements may be found within the CDS 300.

The user device 102 may include an interface module 302 and a media program player 304. The interface module 302 includes instructions performed by the user device 102 that are used to present information and media programs to the user 132 and to accept user input, including commands. Exemplary user devices 102 are a desktop computer, a laptop computer, or a portable device such as an IPOD, IPHONE, IPAD, a portable telephone, or a PALM device.

Figure 4:
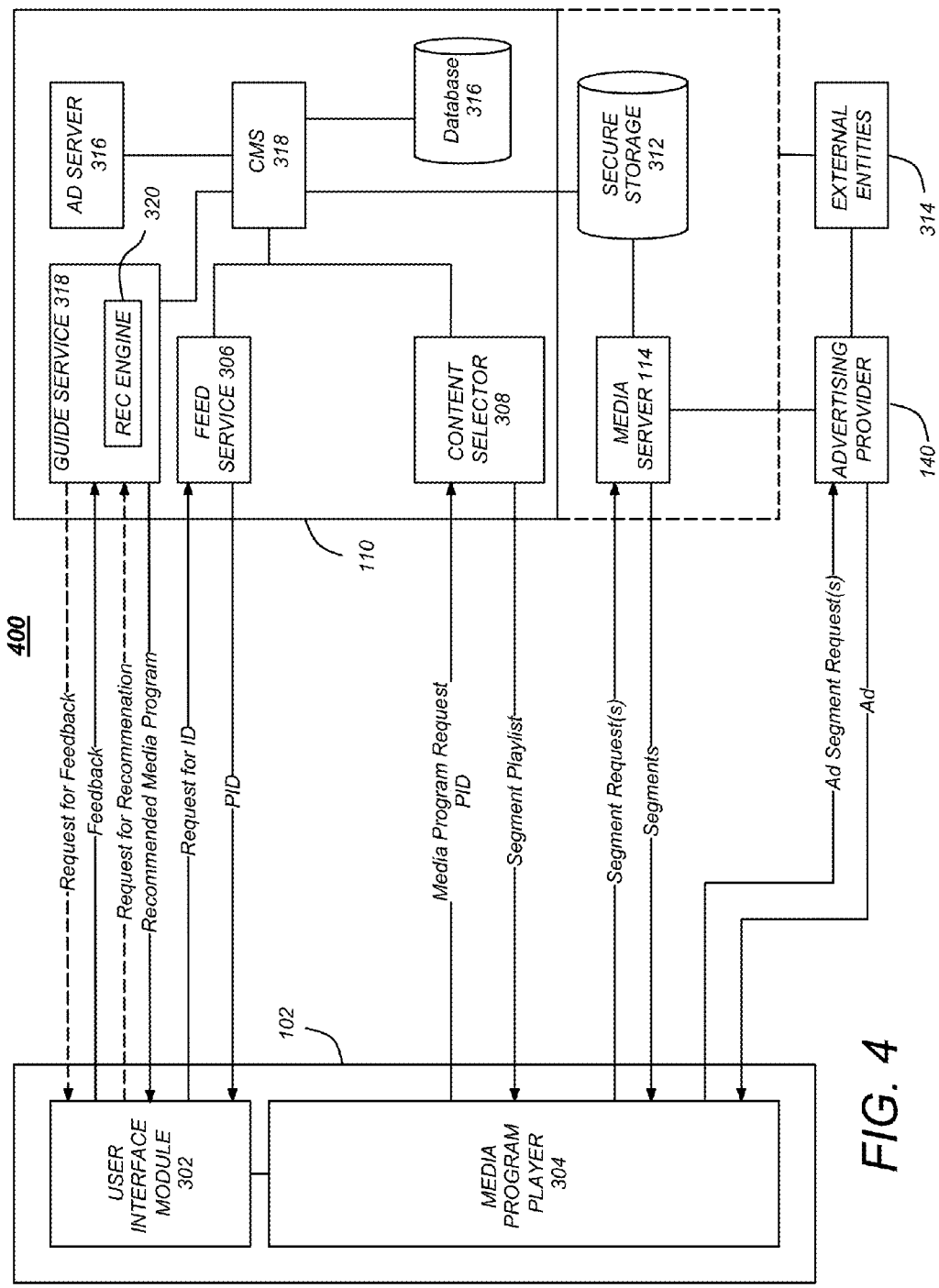
FIG. 4 is a diagram illustrating the transmission of media programs according to a live streaming protocol in accordance with one or more embodiments of the invention.

FIG. 4 is a diagram illustrating the transmission of media programs according to a live streaming protocol. Fundamentally, this protocol is similar to the protocol illustrated in FIG. 3, except that the when the user device 102 requests the media program, it is provided with a "playlist" of small segments or "chunks" of the media program. The user device 102 uses the playlist to request transmission of each chunk of the media program in order, and when each chunk is received, it is processed and assembled into the media program presented to the user 132.

As shown in FIG. 4, the user device 102 transmits a request for the PID of the media program to the feed service 306. The request typically comprises a user ID or a proxy thereof, as well as some identification for the media program. The feed service 306 receives the request, and obtains the PID of the requested media program from the CMS 310, using information obtained from secure storage 312 and content metadata/streaming information database. The PID is then transmitted to the user device 102. The user device then transmits a media program request with the PID to the content selector 308.

In this embodiment, the media program is broken up into a plurality of segments or chunks that can be transmitted to the user device 102 upon request from the user device 102. Which segments to request and the order to request them is determined by a segment playlist that is transmitted from the media program provider 110 to the user device 102.

The live streaming protocol includes the transmission of a segment playlist having addresses or URIs to the media program segments to the media program player 304. Since the media program player 304 has the information necessary to retrieve any segment (and hence, any frame) using the addresses or URIs in the segment playlist, the user interface module 302 implementing the interface 400, responds to the media program navigation commands by determining segment having the media program frames complying with the navigation request, requesting such segments (if they have not already been received and buffered), and presenting the frames from such segments as indicated above.

Regardless of the technique used to transmit media program information to the media program player 304 one of the challenges in offering a wide variety of media programs to users 132 is in presenting such users 132 with information that allow the user 132 to find and select media programs of interest. One approach is to provide the user with a program guide in which media programs are suitably categorized (e.g. by type, content, actors or any number of factors). This may allow the user to find media programs of interest, but are of little use in directing the user to media programs of which they know nothing about, but are still likely to enjoy.

One of the techniques that can be used to find media programs of interest for the user is to use the user interface module 302 to present recommended media programs to the user. Such recommendations can be provided in response to a user 132 request for such recommendations, or without a user request. For example, the user interface module 302 may recommend media programs of interest to the user 132 when the user first accesses the content delivery system 300, when the user 132 is browsing or querying the database 316 to find media programs of interest, when the media program player 304 is playing a media program, or when the media program player 304 has, or is about to complete, playback of a media program.

Figure 5:
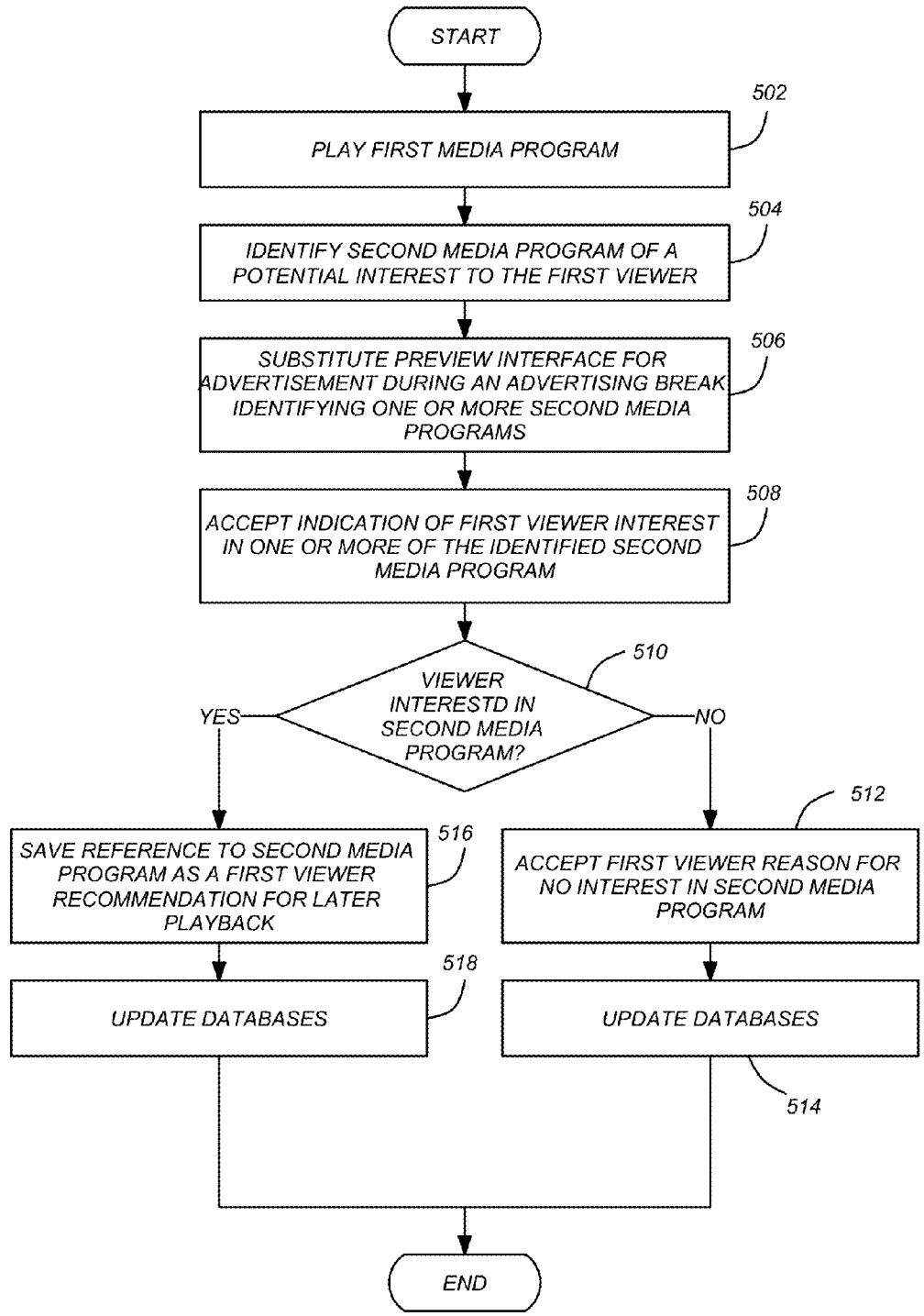
FIG. 5 is a block diagram presenting exemplary operations that can be used to recommend media programs to users in accordance with one or more embodiments of the invention.

FIG. 5 is a block diagram presenting exemplary operations that can be used to recommend media programs to users. In block 502, a first media program is provided to the user device 102 for playing. In block 504, a second media program that is of potential interest to the first viewer is identified.

Figure 6:
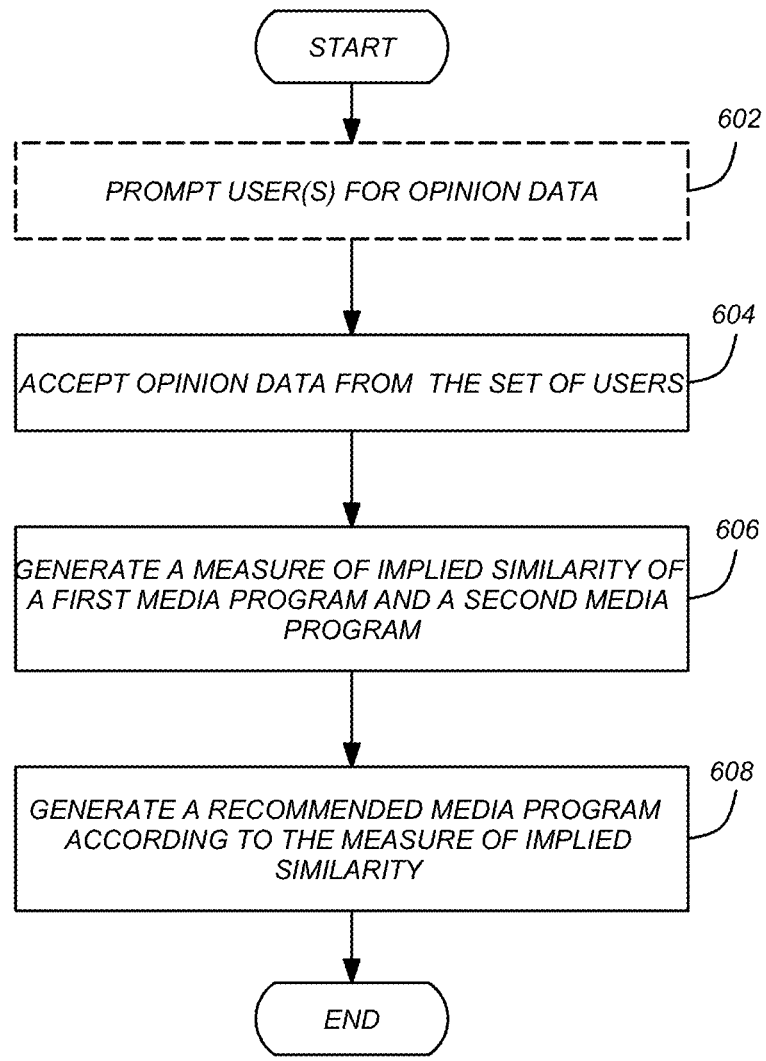
FIG. 6 is a diagram presenting exemplary method steps that can be used to identify second media programs of interest in accordance with one or more embodiments of the invention.

FIG. 6 is a diagram presenting exemplary method steps that can be used identify second media programs of interest. In block 604, opinion data is accepted from one or more of the users 132 in a set of users. The opinion data may include, for example, any combination of data indicating that the user 132 has watched more than a threshold percentage of the media program, that the user 132 has expressly rated the media program, that the user 132 has subscribed to the media program or a series of the media program, or that the user 132 has queued the media program for recording or later playback. In one embodiment, the opinion (or feedback) data may be logical data (chosen from a list of logical alternatives) or boolean data (one of two values such as "yes" or "no" or "1" or "0").

As shown in block 602, the user 132 may be prompted to provide such information, and this prompt may be provided after the user has viewed the media program (e.g. at the end of media program playback or in response to an indication that the user has already seen the media program and does not wish to see it again), during viewing of the media program, or before viewing of the media program. In some cases, the opinion data is inherent to the viewing of the program (e.g. the user is presumed to like the media program if they have watched it for a minimum time period) or other activity (e.g. queuing or subscribing to a media program). U.S. Provisional Patent Application No. 61/392,898 describes techniques that can be used to determine the similarity or relatedness of two media programs for purposes of recommending similar programs. Using those techniques, a measure of the implied similarity of the first media program (i) and the second media program (j) is generated, as shown in block 606. Finally, a recommended media program is generated using the measure of implied similarity, as shown in block 608.

In one embodiment, the foregoing uses a top-n item collaborative filtering algorithm to make recommendations. The service identifies a relationship between a recommended show and the show or content that prompts the recommendation. To find the correlation between two items, we use Conditional Probability-Based $$\text{Similarity where: } w_{ij} = \frac{cocount(i,j)}{\sqrt{count(i)*count(i)}},$$

Count(i)=the count of all users who watched item i,
Count(j)=the count of all users who watched item j,
Cocount(i,j)=the count of all users who watched both item i and item j.

To simplify computations, only the top 30 related items for each recommended show and recommendations are prompted off of no more than these 30 media programs (alternately referred to as 'source shows'). Once the 30 source shows are identified, the media program provider may review the list to remove any unreasonable correlations.

One example of this calculation would be the relationship between "Sanctuary" (as the recommended media program) and "The Dresden Files" (as the source media program), where their correlation is 0.154. The correlation between "Firefly" (as the recommended show) and "The Dresden Files" (the source show) is 0.09. The greater value (0.154) means that there is greater correlation between "The Dresden Files" and "Sanctuary." With all other conditions being equal, this means that someone watching "The Dresden Files" is more likely to be served the "Firefly" as the recommended show. However, the recommendation engine 320 will also account for the user's current viewership and preferences in ultimately identifying a recommended show. A show may be recommended to a user based on any of the following conditions:

1. The show currently being watched;
2. A show the user has watched in the past;
3. A show the user has rated highly;
4. A show the user has subscribed to; and
5. A show the user has added to their queue.

Where possible, the media program provider 110 may consider these conditions for both logged in as well as anonymous users (e.g., using cookies). Different conditions may have different weights. For example, the media program a user is currently watching (which is what is most top-of-mind for the user who is about to receive a media program recommendation) is weighted more heavily than a media program the user has subscribed to at some point in the past. When assessing the weights of conditions for media programs that were either watched or added to a user's queue, the total number of media programs watched or added to queue may be taken into consideration. The media program recommendations engine may also incorporate other relevant users behavior (e.g. search history, tag history, etc.) to broaden the contextual relevance of the recommendations that are made.

The recommendations engine 320 matches the individual user's behavioral conditions with the correlation between two items (in this case, TV shows) and then calculates how likely the user is to be interested in each media program recommendation candidate.

In the previous step, the possible recommendation candidates for a user based on his/her preferences and/or behavior were determined. Next, the recommendations engine 320 decides which individual media program recommendations to provide to the user. The following are the other conditions that are accounted for before a candidate media program is recommended. Any of the following will eliminate a media program recommendation candidate from being served to the user:

1. If the user already saw this media program recommendation candidate within the past 7 days;
2. If the user has already bookmarked the show associated with the media program recommendation candidate;
3. If the user had been exposed to the media program recommendation candidate and indicated that he/she is not interested in that show;
4. If the user has rated the show (which may be served as a media program recommendation candidate) with a rating of less than 3 stars; and
5. If the user is already aware of the show (which may be served as a media program recommendation candidate) and has either watched several episodes, or already rated it, added it to their queue, or subscribed to it.

Since the media program recommendations are served in ad breaks, the ad server 316 is used to deliver the ads. At the same time, the recommendations engine 320 chooses which shows to recommend to which users and for what reasons. For logged in users, the recommendation engine 320 may recommend any show based on the user's viewing habits and content preferences. For users not logged in, the recommended show may be based on a show the user is, or has watched, in their current session (often the show they are currently watching).

One or more media program recommendations are selected from the media programs that pass the above conditions, and may be provided to the user as described below.

In block 506, a preview interface for the recommended media program(s) is substituted for an advertisement during an advertisement break. The preview interface identifies one or more recommended programs to the user, and allows the user to select one or more of those recommended media programs for further viewing, as described below.

Figure 7:
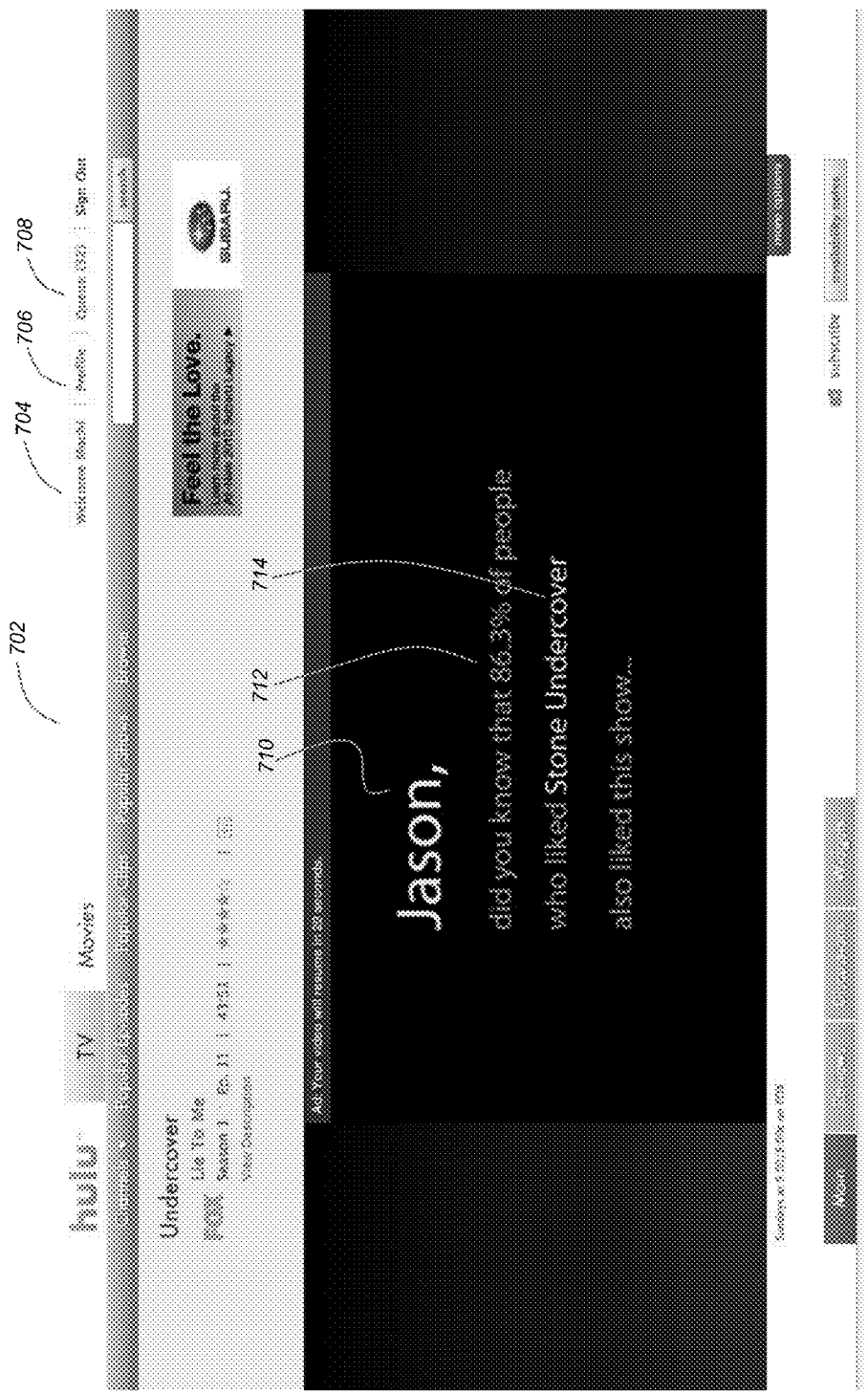
FIG. 7 is a diagram of an exemplary preview interface in accordance with one or more embodiments of the invention.

FIG. 7 is a diagram of an exemplary preview interface 702. In this embodiment, the preview interface addresses a user who has logged in, and is personalized to that user 132. The user 132 is identified by name 710 and in this interface, is informed that a recommended media program exists. In the illustrated embodiment, the interface 702 also indicates the title of the recommended media program (in this case, "Stone Undercover") in area 714, and a statistic indicating why the media program is recommended in area 712.

Messages to the user 132 may include:
1. "Did you know that X % of fans of show A also enjoy this show B [the recommended show]?"
This is based on our analysis of all users who have assigned a rating to both show A and show B.
2. "Did you know that fans of show A are X times more likely to watch this show B [the recommended show]?"
This is based on comparing the percent of all users who watch show B to the percent of fans of show A (i.e. users that assigned a high user rating to show A) who watch show B.

The preview interface 702 may also include an area 706 such that if selected, indicates user 132 information such as the placement of bookmarks (discussed further below), an area 706 which when selected, can be used to view the user profile, and an area 708, which, when selected, can be used to view which media programs the user has queued for future viewing.

In one embodiment, only one recommended media program is presented to the user 132. In this embodiment, the steamboat or trailer for the recommended media program begins playing, and the user 132 is given the opportunity to express an interest in the media program.

Figure 8:
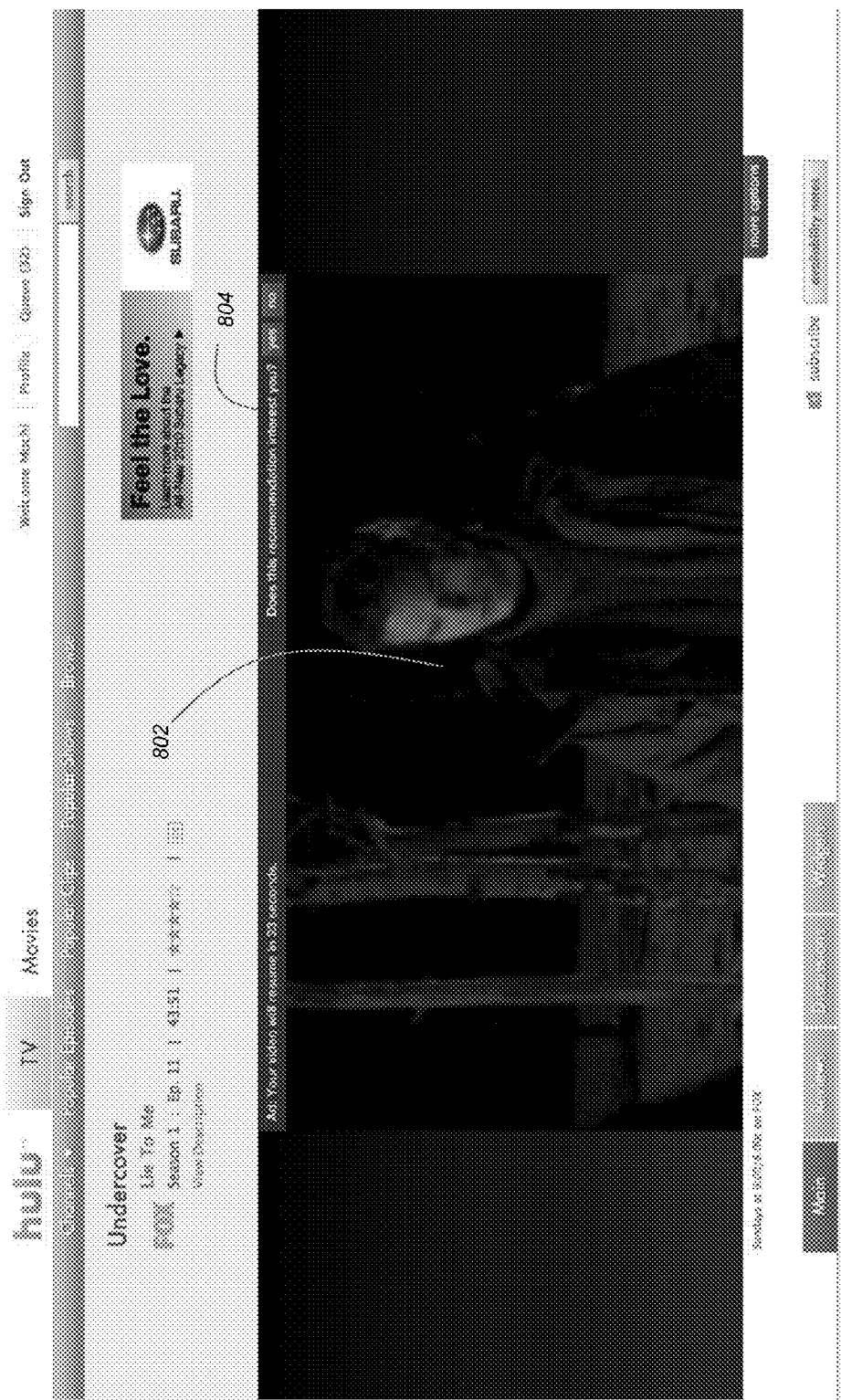
FIG. 8 is a diagram of an exemplary preview interface showing an input area where the user can indicate that they are interested in the recommended media program in accordance with one or more embodiments of the invention.

FIG. 8 is a diagram of an exemplary preview interface 702 showing the playback area 802, where a trailer, advertisement, or media clip of the recommended media program is played, and an input area 804 is provided where the user 132 can indicate that they are interested in the recommended media program. If user has expressed interest in the media program, the indication is accepted and processing passes to blocks 510 and 516-520 of FIG. 5.

In block 516, a reference to the recommended media program is saved for later playback. Playback may be deferred until after the current media program has completed playback, may begin as soon as the current media program has completed playback, or may be bookmarked for later playback as described further below. In block 518, the databases 322 are updated to reflect the user input.

Figure 9:
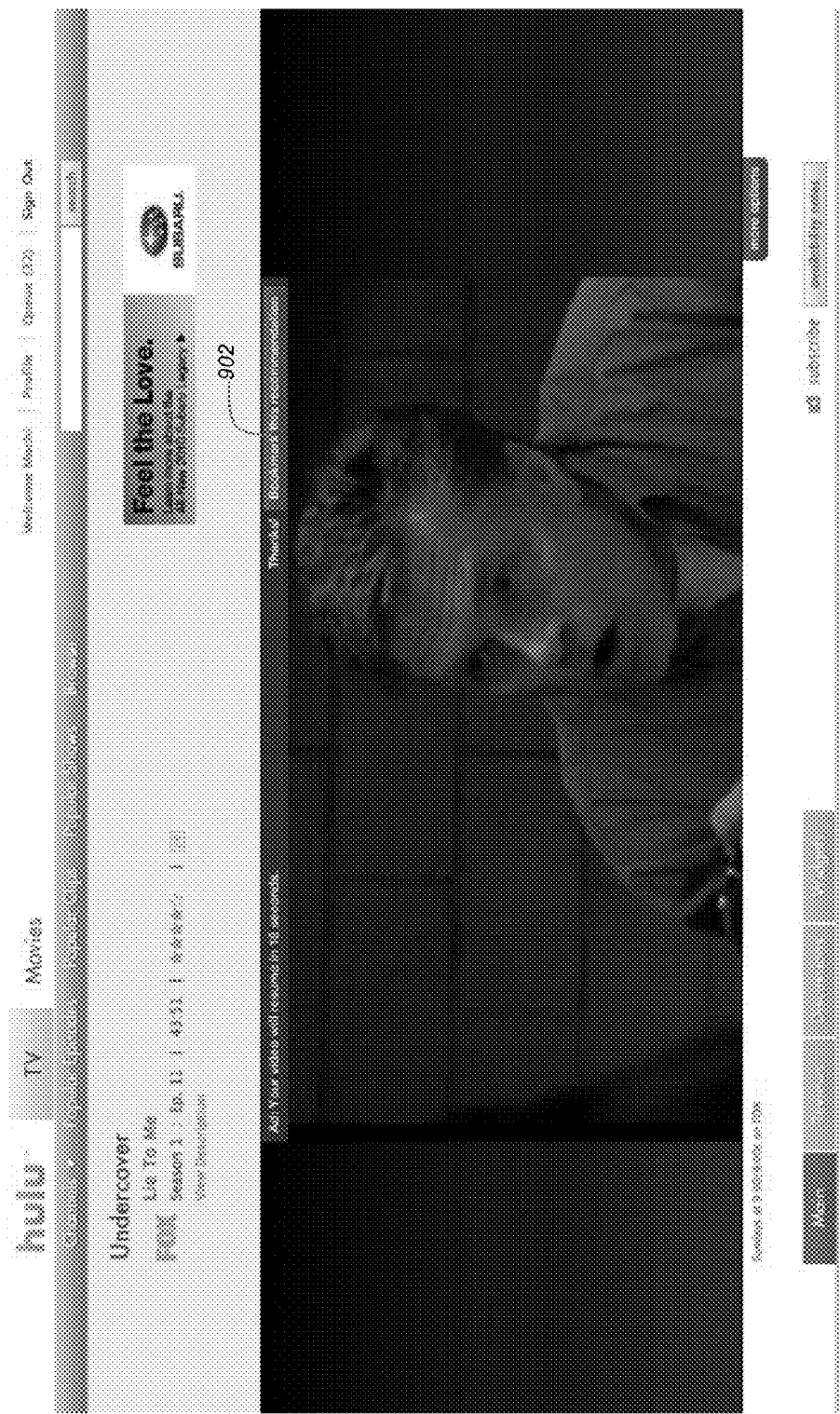
FIG. 9 is a diagram of an exemplary preview interface having a control that bookmarks the recommended media program for viewing in the future in accordance with one or more embodiments of the invention.
Figure 10:
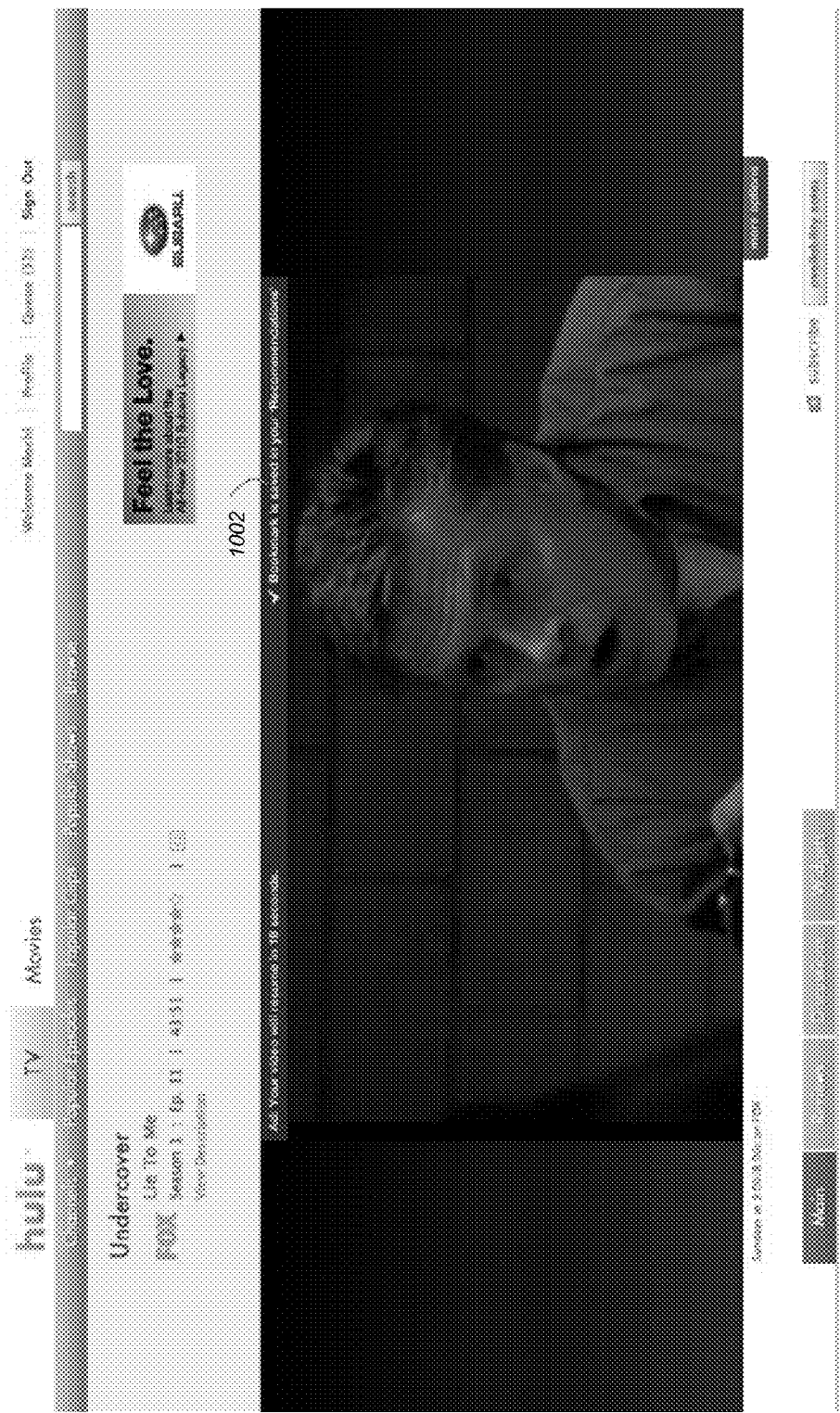
FIG. 10 is a diagram of an exemplary preview interface where the user is provided with an indication of a saved bookmark in accordance with one or more embodiments of the invention.

FIG. 9 is a diagram of an exemplary preview interface 702 having a control 902 that bookmarks the recommended media program for viewing in the future. If the user 132 selects this control, the bookmark is saved, and the user is provided with an indication of the saved bookmark, as shown in item 1002 of FIG. 10.

Figure 11:
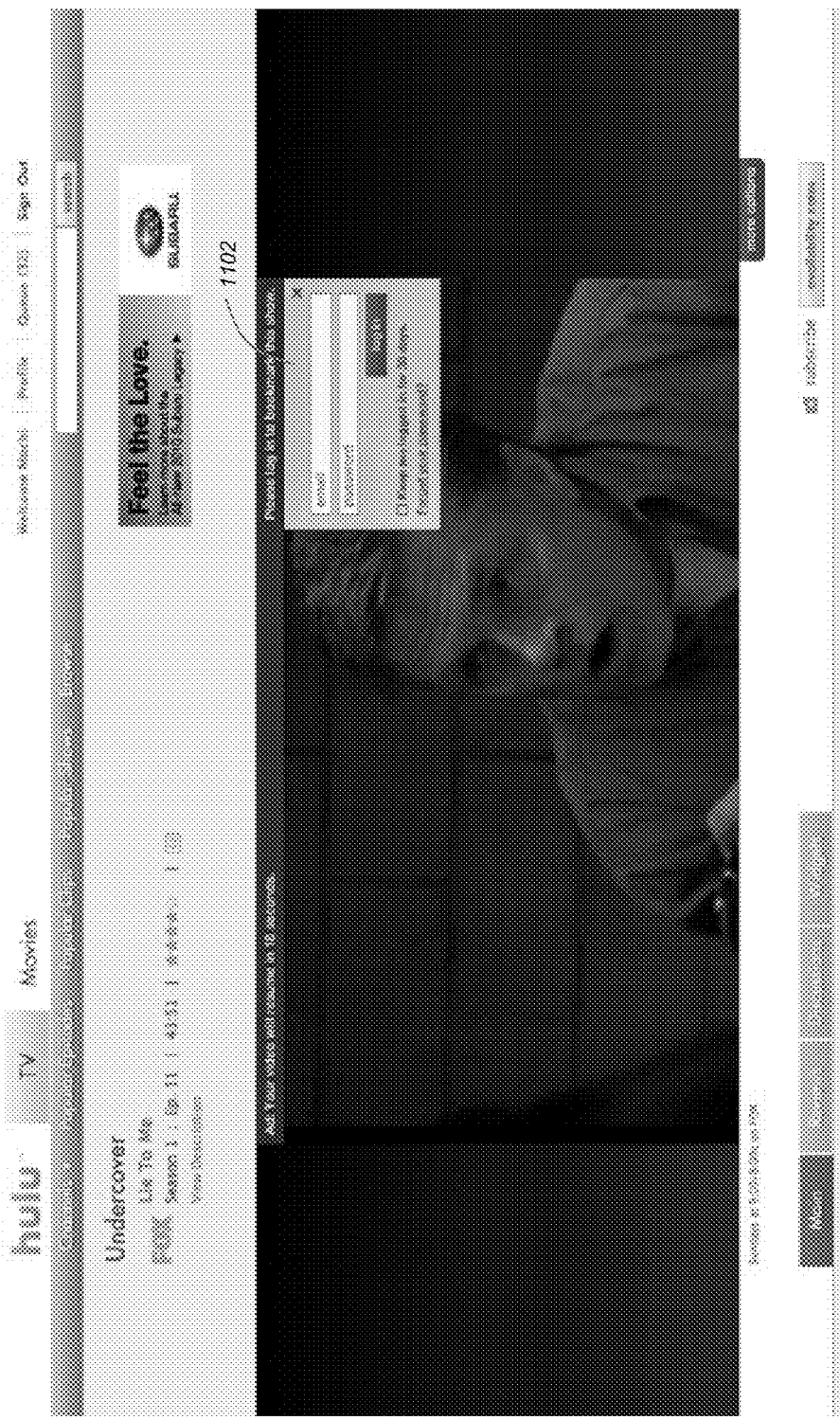
FIG. 11 is a diagram of an exemplary preview interface having a control to log in as a user in accordance with one or more embodiments of the invention.

If the user has not logged in, they will need to do so before the bookmark can be saved. An interface 1102 for doing so is presented in FIG. 11. Alternatively, cookies may be used to identify bookmarked information for a particular browser/computer.

Returning to FIG. 5, if the user has expressed no interest in viewing the recommended media program (either by expressly indicating as such, or failing to respond to a prompt within a designated period of time), the user may be provided an interface to indicate why they were not interested in the recommended media program.

Figure 12:
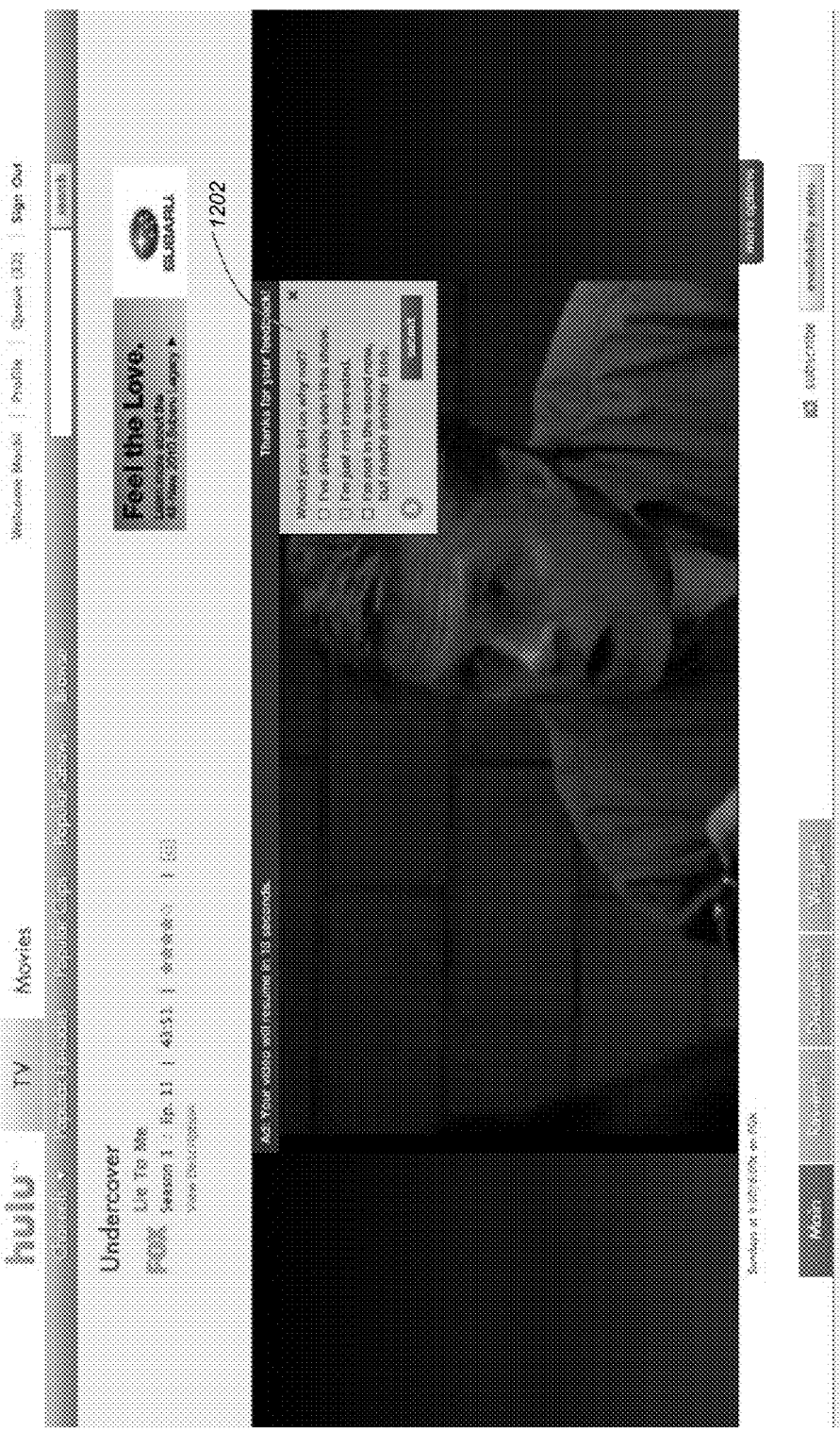
FIG. 12 is a diagram illustrating an exemplary preview interface if the user has indicated that they are not interested in watching the recommended media program in accordance with one or more embodiments of the invention.

FIG. 12 is a diagram illustrating an exemplary preview interface 702 if the user has indicated that they are not interested in watching the recommended media program. In this embodiment, the preview interface 702 includes an input interface 1202 in which the user may provide feedback regarding the recommended media program, for example, to indicate why they were not interested in the recommended media program. In the illustrated embodiment, three choices are provided (1) the user 132 has already seen the media program, (2) the user 132 is not interested, and (3) the user is not in the mood to select the media program in the near future, but may want to do so at a future time. The exemplary input interface 1202 also includes a submit button and a countdown timer indicating how much time the user 132 has left to enter the information in the input interface 1202. The accepted information is stored in the database for future use recommendations, both for this user and for other users, as shown in blocks 512 and 514. In addition, the update databases step 514 may be used to update the user information so that the user never sees the same steamboat or trailer for a recommended media program.

Figure 13:
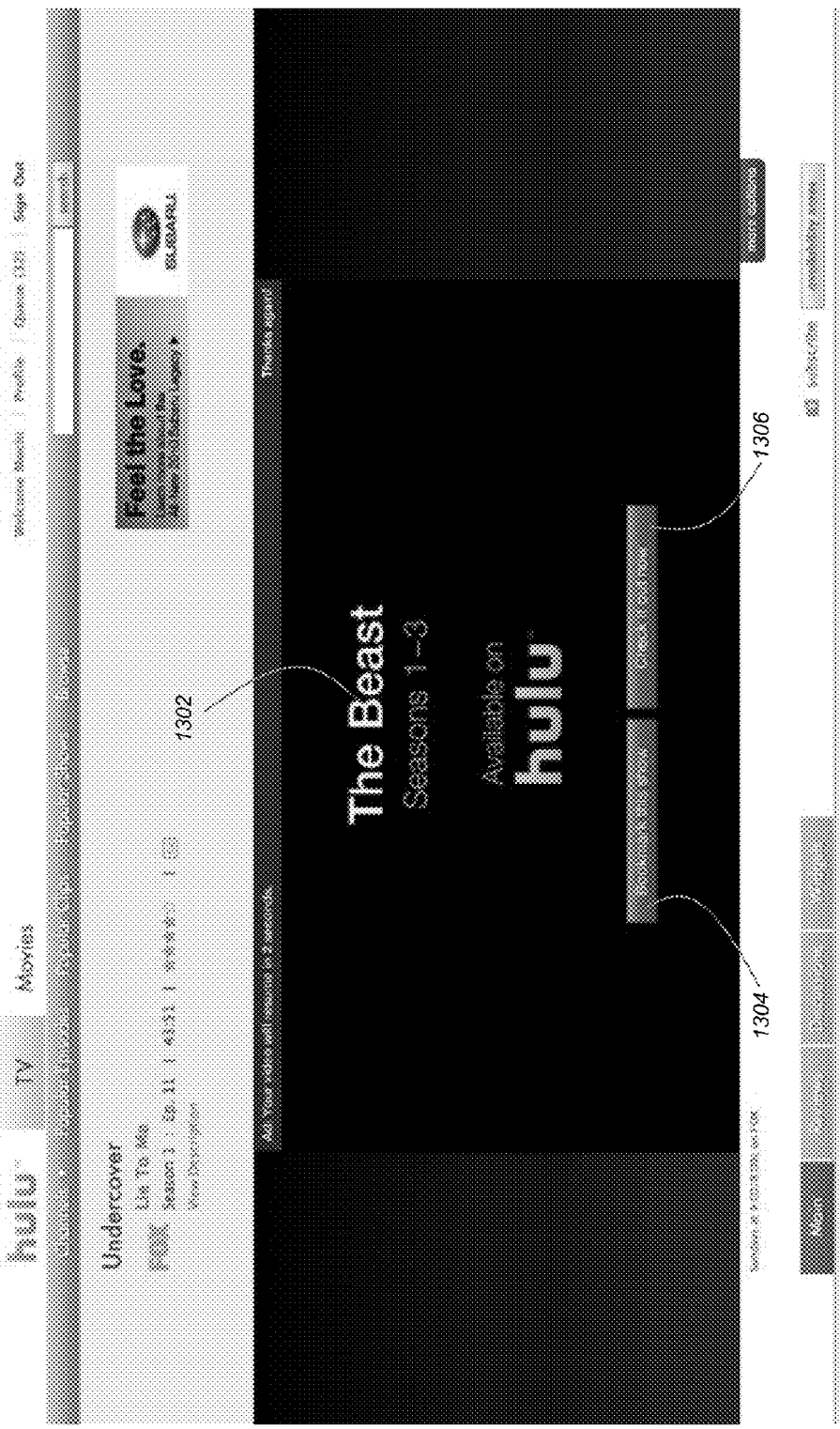
FIG. 13 presents the preview interface after the media clip/trailer for the recommended media program has been shown in accordance with one or more embodiments of the invention.
Figure 14:
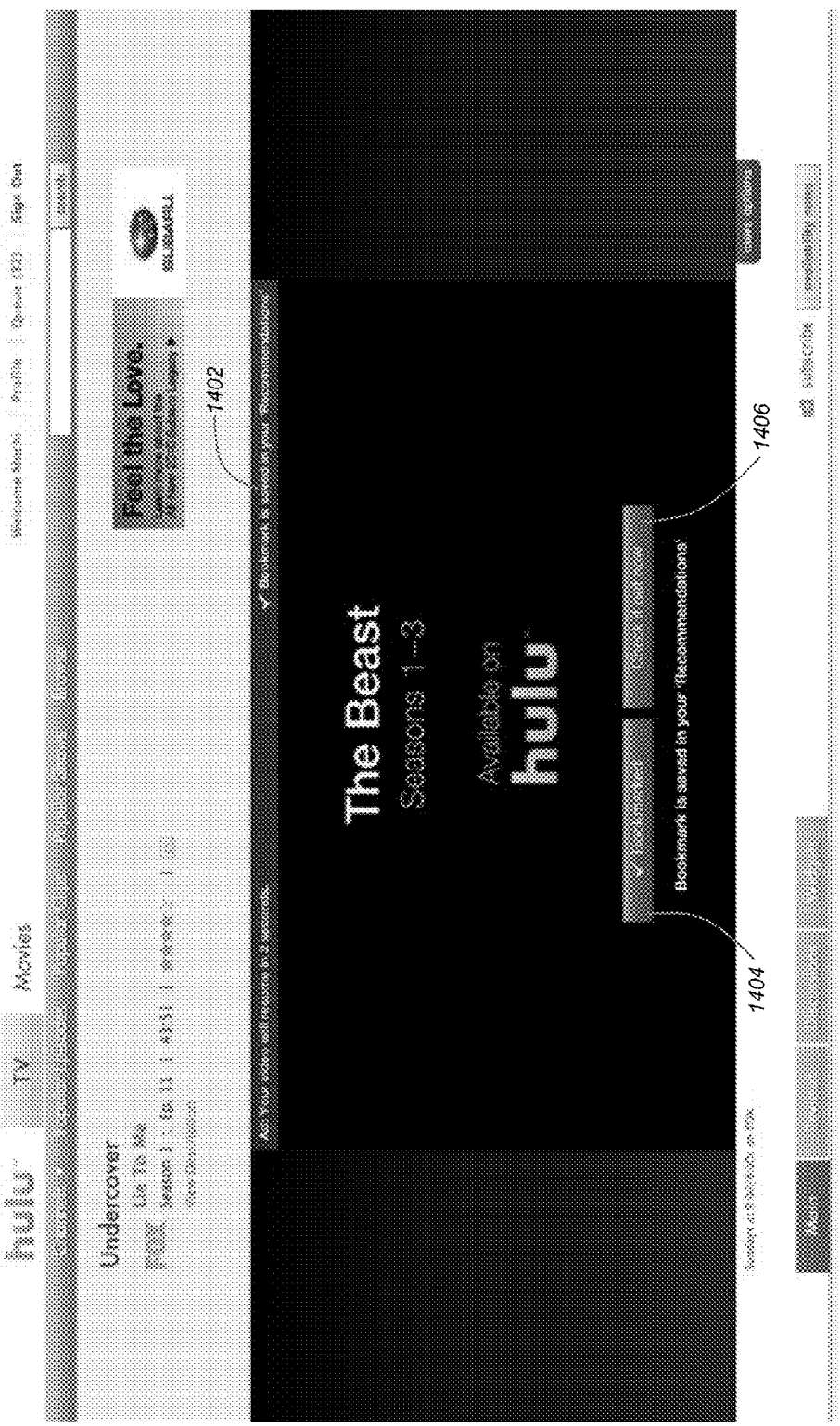
FIG. 14 presents the interface once the user has selected the bookmark option in accordance with one or more embodiments of the invention.

FIG. 13 presents the preview interface 702 after the media clip/trailer for the recommended media program has been shown. The interface includes a title of the recommended media program or series 1302 a control for bookmarking the show 1304 and a control for immediately beginning playback of the show 1306. FIG. 14 presents the interface once the user has selected the bookmark option. The elements 1402 and 1404 indicate that the selection has been bookmarked, and control 1406 permits the user 132 to view the media program immediately.

User Interface Summary

The foregoing user interface includes the following elements:

1. Introductory title card (e.g. FIG. 7) explaining why it is thought that the user will enjoy the recommended show. If the user is logged in, these title cards are personalized ("Eugene, did you know that viewers of 30 Rock are 10 times more likely to also enjoy Peep Show?"). If the user is not logged in, we still explain the relevance of the following recommendation using contextual information such as the title of the current show they're watching ("79% of viewers who enjoy [title of show they just watched] also watch the following show.")

2. Video montage (FIGS. 8-12) from the show. The goal of this section, which makes up the majority of the duration of the media program recommendation, is to introduce the general storyline, style, and mood of the program/title. The goal is not to spoil the show for people but to generate some intrigue and suspense. Use of interstitial text cards to establish the narrative flow of the video or to post noteworthy critical acclaim is often applied when available. Using music from the show is effective at conveying mood. The overall goal is similar to that of a movie trailer, though establishing the storyline of an entire TV series is more complex than simply establishing that of a single movie.

3. Users can take immediate action on the recommended program advertisement. Since the media program recommendations are served as ads, a message is displayed as the video montage begins, which asks (in the upper right corner of the player) "Is this recommendation interesting to you? Yes/No". A user who answers "Yes" is then offered the option to "Bookmark this recommendation" for later viewing. A user who answers "No" is then asked a multiple choice question as to why they are not interested. None of these interactions are required. The media program ad will continue to play regardless. But for those users who indicate they are not interested, the same media program ad may never be served to them again. Additionally, valuable insights may be gained should the user explain why they are not interested. In either case, the user's reaction may be factored into future media program ads they may be shown.

Finally, a user can also click on the media program ad itself and be taken to the show page of the promoted show at any time.

4. End card (FIGS. 13 and 14). The end card does two things: 1) It establishes for the end user what content from the show is available: how many seasons, and which ones; and 2) It offers the user options to take action on the recommendation they've just seen. The user has two options/buttons in the end card: 1) to go "Check it [the show] out now" which immediately takes the user to the appropriate show page; and 2) to "Bookmark this Show" for later viewing. The latter option will drop the show into a new list of shows that may be tracked in the user's profile called "My Bookmarks."

In one or more embodiments of the invention, the "My Bookmarks" area may include a queue or listing of shows that have been bookmarked by the user. Shows may be bookmarked using the recommended clip as described above. Alternatively, shows may be bookmarked by the user searching for shows, receiving requests to bookmark the shows from third parties (e.g., friends in a social networking application), by the user via a peripheral device (e.g., cellular device), by the user via a social networking application (e.g., via a Facebook™ application), via email/SMS/text message from the user, etc. Thus, a user may bookmark a show in a variety of manners and such bookmarks may be used to identify a show that the user is interested in but didn't have time to watch right away. Such bookmarks may be used to automatically link directly to a playable version of the show when the user desires. Bookmarks may be sorted in a variety of manners including: alphabetically, highest rated by other uses, date added as a bookmark, date of release of show, date of addition of the show to a content library, highest rated based on user's profile, etc.

Recommendation Workflow

The recommendation engine 320 works together with the video player 304 and ad server 316 as follows:

1. Player 304 calls Recommendation Service 320: When a user 132 begins watching some long form video, the media program player 304 calls the recommendation engine 320 and provide the user ID, the ID of the current video the user is watching, as well as the user's history of recommended media program exposure (this is possible through the use of cookies);

2. Recommendation Engine 320 calls back to Player304: Once the recommendation engine 320 has received the request from the player, the engine 320 will calculate and deliver a list of media program recommendation candidates that could be delivered to the user 132;

3. Player passes info to Ad Server 316: When the user 132 is about to reach the final ad pod, the Player 304 requests an advertisement from the Ad Server 316 while at the same time providing the ID of any recommended media program ads that may be appropriate for the user;

4. Ad server 316 decides which ad or recommended media program trailer to deliver: If there is one or more recommended media program ads in the request from the player, the ad server 316 will then determine whether the recommended media program ad should be served or if there is another ad that must take precedence (often, a paid advertisement will be given priority over a recommended media program ad). The ad server 316 is also responsible for considering any recommended media program frequency caps or other conditions which would make the recommended media ad inappropriate (e.g., age constraints);

5. Player 304 serves the Recommended Media Program Ad: If the ad server determines an appropriate recommended media program, the Player 304 will render the recommended media program ad to the user and deliver the personalized message; and 6. Player records user feedback: Should the user interact with the recommended media program ad, that information will be recorded by the player.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for recommending alternative programming during playback of a first media program having a plurality of advertising breaks to a first viewer, the method comprising:
   receiving, from a media player, an indication that the first media program is being played by the first viewer;
   dynamically identifying a second media program of a potential interest to the first viewer from a plurality of media programs that are offered by a media program provider;
   providing information for the second media program to the media player, wherein the media player provides the information for the second media program to an ad server in a request for an advertisement during an advertising break;
   during the advertising break, enabling a presentation on the media player of an interface identifying the second media program instead of an advertisement when the media player receives information for the second media program from the ad server, wherein the ad server dynamically determined the second media program should be identified during the advertising break instead of a set of advertisements available for playing during the advertising break;
   accepting an indication of first viewer interest in the identified second media program; and
   in response to the accepted indication of first viewer interest in the identified second media program:
      if the accepted indication of first viewer interest indicates that the first viewer is interested in the second media program, saving a reference to the second media program as a first viewer recommendation for later playback.

2. The method of claim 1, wherein, if the accepted indication of first viewer interest indicates that the first viewer is not interested in the second media program:
   enabling a feedback presentation on the media player that accepts a first viewer feedback explaining why the first viewer is not interested in the second media program.

3. The method of claim 1, wherein the second media program is identified after playback of the first media program begins.

4. The method of claim 1, wherein the advertising break is a concluding advertising break.

5. The method of claim 1, wherein the second media program is identified based upon one or more factors comprising:
   a fraction of first media program viewers evidencing a liking of both the first media program and the second media program.

6. The method of claim 5, wherein the interface further comprises an indication of at least one of the one or more factors and a metric of the at least one of the one or more factors.

7. The method of claim 6, wherein the interface is personalized to the first viewer based on the first viewer's current viewership and/or preferences.

8. The method of claim 1, wherein the interface comprises:
   a playback of a clip of the second media program; and
   a viewer interest input interface to indicate first viewer interest in the second media program, the viewer interest input interface being presented concurrently with the playback of the clip of the second media program and permitting interruption of the playback of the clip of the second media program.

9. The method of claim 1, wherein the reference is saved as a bookmark.

10. The method of claim 1, wherein playback of the second media program automatically begins upon completion of playback of the first media program.

11. The method of claim 1, wherein the interface identifying the second media program is substituted for an advertisement scheduled to be played during the advertising break.

12. The method of claim 11, wherein the scheduled advertisement is an uncompensated advertisement.

13. The method of claim 1, wherein the ad server dynamically determined when the presentation identifying the second media program should be played during the advertising break in place of the advertisement by analyzing ad impression information for the set of advertisements available for playing during the advertising break to determine when the presentation identifying the second media program should be played during the advertising break in place of the advertisement.

14. A system for recommending alternative programming during playback of a first media program having a plurality of advertising breaks to a first viewer, in a computer system comprising:
   a computer having a memory; and
   an application executing on the computer, wherein the application is configured to:
   receive, from a media player, an indication that the first media program is being played by the first viewer;
   dynamically identify a second media program of a potential interest to the first viewer from a plurality of media programs that are offered by a media program provider;
   provide information for the second media program to the media player, wherein the media player provides the information for the second media program to an ad server in a request for an advertisement during an advertising break;
   during the advertising break, enable a presentation on the media player of an interface identifying the second media program instead of an advertisement when the media player receives information for the second media program from the ad server, wherein the ad server dynamically determined the second media program should be identified during the advertising break instead of a set of advertisements available for playing during the advertising break;
   accept an indication of first viewer interest in the identified second media program; and
   in response to the accepted indication of first viewer interest in the identified second media program:
      if the accepted indication of first viewer interest indicates that the first viewer is interested in the second media program, save a reference to the second media program as a first viewer recommendation for later playback.

15. The system of claim 14, wherein, if the accepted indication of first viewer interest indicates that the first viewer is not interested in the second media program:
   the application is further configured to enable a feedback presentation on the media player that accepts a first viewer feedback explaining why the first viewer is not interested in the second media program.

16. The system of claim 14, wherein the second media program is identified after playback of the first media program begins.

17. The system of claim 14, wherein the advertising break is a concluding advertising break.

18. The system of claim 14, wherein the second media program is identified based upon one or more factors comprising:
a fraction of first media program viewers evidencing a liking of both the first media program and the second media program.

19. The system of claim 18, wherein the interface further comprises an indication of at least one of the one or more factors and a metric of the at least one of the one or more factors.

20. The system of claim 19, wherein the interface is personalized to the first viewer based on the first viewer's current viewership and/or preferences.

21. The system of claim 14, wherein the interface comprises:
a playback of a clip of the second media program; and
a viewer interest input interface to indicate first viewer interest in the second media program, the viewer interest input interface being presented concurrently with the playback of the clip of the second media program and permitting interruption of the playback of the clip of the second media program.

22. The system of claim 14, wherein the reference is saved as a bookmark.

23. The system of claim 14, wherein playback of the second media program automatically begins upon completion of playback of the first media program.

24. The system of claim 14, wherein the interface identifying the second media program is substituted for an advertisement scheduled to be played during the advertising break.

25. The system of claim 24, wherein the scheduled advertisement is an uncompensated advertisement.

26. A method for recommending alternative programming during playback of a first media program having a plurality of advertising breaks to a first viewer, the method comprising:
playing the first media program by a media player;
receiving by said media player an identification of a second media program of a potential interest to the first viewer from a plurality of media programs that are offered by a media program provider;
providing from the media player the identification of the second media program to an ad server in a request for an advertisement during an advertising break;
during the advertising break, presenting an interface identifying the second media program instead of an advertisement when receiving information for the second media program from the ad server, wherein the ad server dynamically determined the second media program should be identified during the advertising break instead of a set of advertisements available for playing during the advertising break;
accepting an indication of first viewer interest in the identified second media program; and
in response to the accepted indication of first viewer interest in the identified second media program:
if the accepted indication of first viewer interest indicates that the first viewer is interested in the second media program, transmitting a reference to the second media program as a first viewer recommendation for later playback.

27. The method of claim 26, wherein, if the accepted indication of first viewer interest indicates that the first viewer is not interested in the second media program:
presenting a feedback interface that accepts a first viewer feedback explaining why the first viewer is not interested in the second media program; and
accepting the viewer feedback.

28. The method of claim 26, wherein the second media program is identified after playback of the first media program begins.

29. The method of claim 26, wherein the advertising break is a concluding advertising break.

30. The method of claim 26, wherein the second media program is identified based upon one or more factors comprising:
a fraction of first media program viewers evidencing a liking of both the first media program and the second media program.

31. The method of claim 30, wherein the interface further comprises an indication of at least one of the one or more factors and a metric of the at least one of the one or more factors.

32. The method of claim 31, wherein the interface is personalized to the first viewer based on the first viewer's current viewership and/or preferences.

33. The method of claim 26, wherein the interface comprises:
a playback of a clip of the second media program; and
a viewer interest input interface to indicate first viewer interest in the second media program, the viewer interest input interface being presented concurrently with the playback of the clip of the second media program and permitting interruption of the playback of the clip of the second media program.

34. The method of claim 26, wherein the reference is saved as a bookmark.

35. The method of claim 26, wherein playback of the second media program automatically begins upon completion of playback of the first media program.

36. The method of claim 26, wherein the interface identifying the second media program is substituted for an advertisement scheduled to be played during the advertising break.

37. The method of claim 36, wherein the scheduled advertisement is an uncompensated advertisement.

38. A system for recommending alternative programming during playback of a first media program having a plurality of advertising breaks to a first viewer, in a computer system comprising:
a computer having a memory; and
an application executing on the computer, wherein the application is configured to:
play the first media program with a media player;
receive by the media player an identification of a second media program of a potential interest to the first viewer from a plurality of media programs that are offered by a media program provider;
provide from the media player the identification of the second media program to an ad server in a request for an advertisement during an advertising break;
during an advertising break, present an interface identifying a second media program instead of an advertisement when receiving information for the second media program from the ad server, wherein the ad server dynamically determined the second media program should be identified during the advertising break instead of a set of advertisements available for playing during the advertising break;
accept an indication of first viewer interest in the identified second media program; and in response to the accepted indication of first viewer interest in the identified second media program:
if the accepted indication of first viewer interest indicates that the first viewer is interested in the second media program, transmit a reference to the second media program as a first viewer recommendation for later playback.

39. The system of claim 38, wherein, if the accepted indication of first viewer interest indicates that the first viewer is not interested in the second media program the application is further configured to:
present a feedback interface that accepts a first viewer feedback explaining why the first viewer is not interested in the second media program; and
accept the viewer feedback.

40. The system of claim 38, wherein the second media program is identified after playback of the first media program begins.

41. The system of claim 38, wherein the advertising break is a concluding advertising break.

42. The system of claim 38, wherein the second media program is identified based upon one or more factors comprising:
a fraction of first media program viewers evidencing a liking of both the first media program and the second media program.

43. The system of claim 42, wherein the interface further comprises an indication of at least one of the one or more factors and a metric of the at least one of the one or more factors.

44. The system of claim 43, wherein the interface is personalized to the first viewer based on the first viewer's current viewership and/or preferences.

45. The system of claim 38, wherein the interface comprises:
a playback of a clip of the second media program; and
a viewer interest input interface to indicate first viewer interest in the second media program, the viewer interest input interface being presented concurrently with the playback of the clip of the second media program and permitting interruption of the playback of the clip of the second media program.

46. The system of claim 38, wherein the reference is saved as a bookmark.

47. The system of claim 38, wherein playback of the second media program automatically begins upon completion of playback of the first media program.

48. The system of claim 38, wherein the interface identifying the second media program is substituted for an advertisement scheduled to be played during the advertising break.

49. The system of claim 48, wherein the scheduled advertisement is an uncompensated advertisement.

* * * * *